E. W. DE WILTON.
COMBINATION HOSE COUPLING AND AIR VALVE PLUG.
APPLICATION FILED APR. 5, 1917.
1,272,234.
Patented July 9, 1918.
2 SHEETS—SHEET 1.
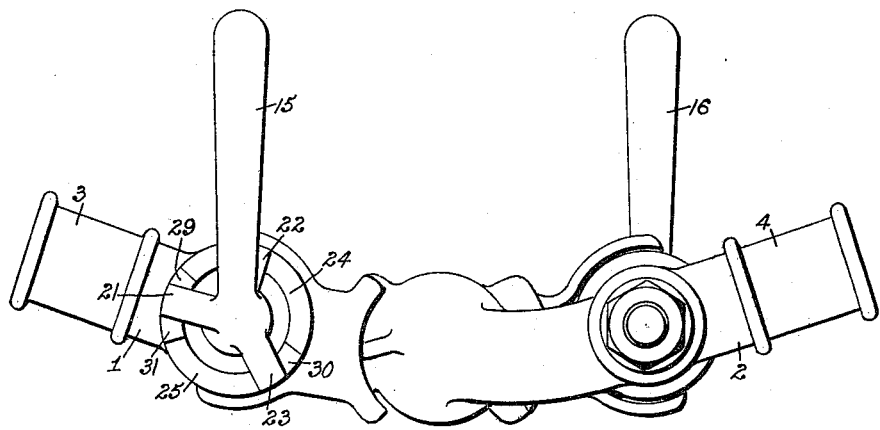
Fig. 1.
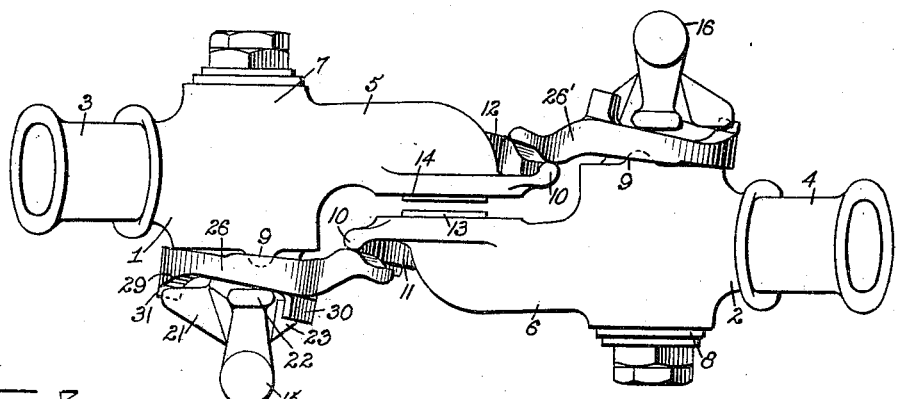
Fig. 2.
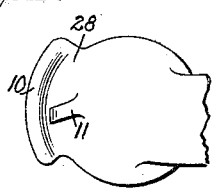
Fig. 8.
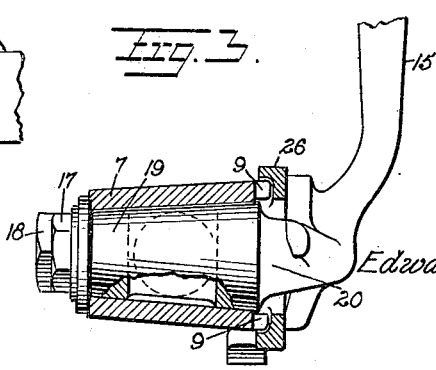
Fig. 3.
WITNESSES
H. T. Walker
A. L. Kitchin
INVENTOR
Edward W. De Wilton
BY 
ATTORNEYS E. W. DE WILTON.
COMBINATION HOSE COUPLING AND AIR VALVE PLUG.
APPLICATION FILED APR. 5, 1917.

1,272,234.

Patented July 9, 1918.
2 SHEETS—SHEET 2.

WITNESSES
H. J. Walker
A. L. Kitchin

INVENTOR
Edward W. De Wilton
BY
ATTORNEYS

UNITED STATES PATENT OFFICE.

EDWARD WILSON DE WILTON, OF NEW YORK, N. Y.

COMBINATION HOSE-COUPLING AND AIR-VALVE PLUG.

1,272,234.  Specification of Letters Patent.  Patented July 9, 1918.

Application filed April 5, 1917. Serial No. 159,997.

*To all whom it may concern:*

Be it known that I, EDWARD W. DE WILTON, a citizen of the United States, and a resident of the city of New York, borough of Manhattan, in the county and State of New York, have invented a new and Improved Combination Hose - Coupling and Air-Valve Plug, of which the following is a full, clear, and exact description.

This invention relates to couplers or air hose and has for an object the provision of an improved construction for use on the air brake system of trains whereby a minimum effort is required for coupling and uncoupling.

Another object in view is to provide a coupler for the air brake system of trains which will allow the couplers to come directly together in a horizontal line and then be uncoupled.

A still further object of the invention is to provide a coupler for air brake systems in which the valves in the system are located in the couplers and are turned on and off as the couplers are coupled and uncoupled.

In the accompanying drawings:—

Figure 1 is a side view of a coupler embodying the invention, the parts being together but in an uncoupled condition.

Fig. 2 is a top plan view of the structure shown in Fig. 1.

Fig. 3 is a fragmentary sectional view through one of the valves and associated parts shown in Fig. 1.

Fig. 8 is a fragmentary side elevation of the exterior of one of the coupling members.

Referring to the accompanying drawings by numerals, 1 and 2 indicate coupling members which in general arrangement are formed standard so as to be readily used with the standard coupling now in use on railroads. The end members 3 and 4 of the coupling members 1 and 2 are arranged to be connected in any suitable manner to a flexible hose as now in common use, or to metallic hose or, in fact, any desired hose. The reason that any kind of hose or even stiff pipe may be used is that the couplers are constructed so as to be tilted upwardly and coupled in the usual way of the standard coupler now on the market or adapted to be coupled by being brought together in a straight line on a horizontal plane and then unlocked.

Figure 5:
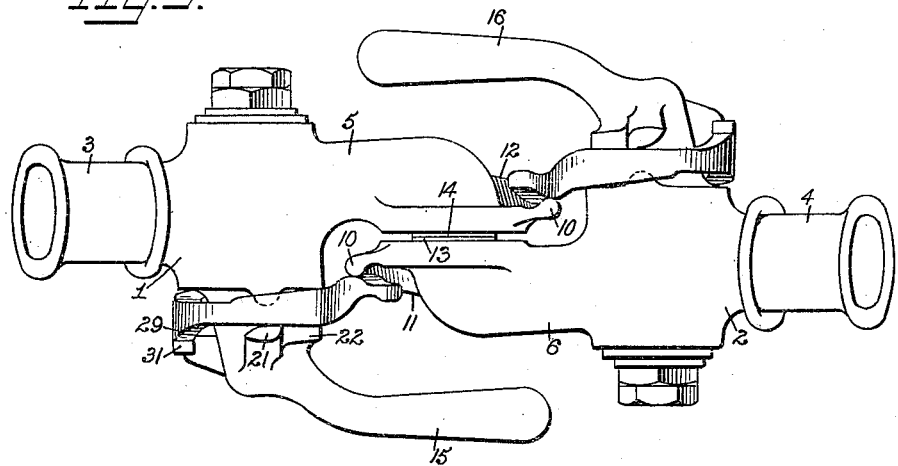
Fig. 5 is a top plan view of the structure shown in Fig. 4.
Figure 6:
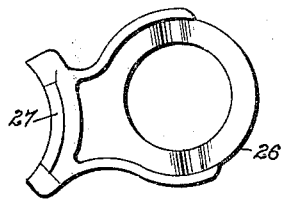
Fig. 6 is an enlarged side view of one of the locking rings embodying certain features of the invention.
Figure 7:
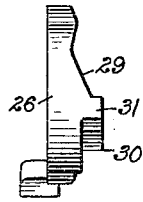
Fig. 7 is an edge view of the ring shown in Fig. 6.

In producing a structure of this kind the coupling members 1 and 2 are provided with casings 5 and 6 formed substantially standard in shape except that valves 7 and 8 are provided, pivotal projections 9 are provided on each casing and a flange 10 is provided on each casing. In addition to these members, limiting lugs 11 and 12 are provided so as to limit the movement of the couplers when coming together whereby the washers 13 and 14 may be held in alinement, as shown in Fig. 2, before the parts are properly interlocked as shown in Fig. 5. It will be noted that the valves 7 and 8 are of the ordinary plug type of valve and that the casing 5 forms a casing for the valve. Any other form of valve may be used as may be desired without in any way departing from the spirit of the invention, provided it is capable of fully opening and fully closing on a substantially quarter revolution of the operating handles 15 and 16.

Figure 4:
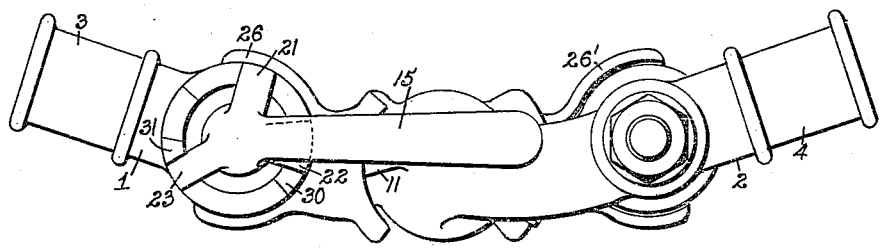
Fig. 4 is a view similar to Fig. 1 except the parts are locked together.

When using the plug valves as shown in the drawing, a retaining nut 17 is provided for each valve and also a lock nut 18 whereby the valves are locked in any desired adjustment in order to allow a proper operation of the valves without leaking. The plug 19 of each valve merges into a stem 20 which in turn merges into a handle, as for instance, handle 15 for valve 7 and handle 16 for valve 8, and stem 20 also merges into three arms, namely, arms 21, 22 and 23, arms 22 and 23 acting against the cam surfaces 24 and 25 on the locking ring 26. These cam surfaces are made at such an angle as to allow the arms 22 and 23 to tilt the ring 26 from the position shown in Fig. 2 to the position shown in Fig. 5, whereby the washers 13 and 14 and associated parts will be brought tightly together and locked in their closed position. In order to cause this locking movement the handle 15 is moved from the position shown in Fig. 1 to that shown in Figs. 4 and 5. Simultaneously with the movement of the handle 15, handle 16 will likewise be moved to the position shown in Fig. 5. It is to be understood that both members 1 and 2 are identical so that the description of plug 19, stem 20 and associated parts in regard to valve 7 will equally apply to valve 8, there being a ring 26' for valve 8 constructed identically with the ring 26.

As shown in Fig. 8, each of the valves is provided with a bead or raised portion 10 and a lug 11 or 12, as the case may be. Rings 26 and 26' are also provided with a complementary bead or raised portion 27 which fits into the space 28, as shown in Fig. 8, so as to prevent accidental disengagement of the couplers when locked together, the bead 27 overlapping the bead 10. The bead 10 is arranged to press against a bearing surface 29 so as to force the coupling member 2 in one direction, while the same structure on ring 26' acts on the bead 10 of the coupling member 1 to force said coupling member toward the coupling member 2.

When the handles 15 and 16 are both moved pivotally toward each other from the position shown in Fig. 1 to that shown in Fig. 5 both movements of members 1 and 2 will be simultaneous and a proper interlocking will result. When it is desired to unlock the couplers the handles 15 and 16 are merely raised from the position shown in Fig. 1 and the parts are disengaged so as to be readily moved apart. Moving the handles to the position shown in Fig. 1 not only releases the parts, but the arm 21 on the stem 20 acts on the cam face 29 for tilting the rings to the open position, the tilting movement being on the extensions 9. As shown particularly in Figs. 1 and 4, the ring 26 is provided with upstanding lugs 30 and 31 which act as stops for the various arms 21, 22 and 23 in their back and forth movement and positively limit the turning movement of the handles 15 and 16 so that an operator cannot move the valves past a full open position.

As is well known, the automatic brake system on trains now in use provides a valve at each end of the car so as to turn on and off the air. Connected with each of these valves is a hose which at the lower end is secured to a standard coupler or one coupling member of a complete coupler so that when two cars are to be coupled these two coupling members may be moved upwardly and tilted at a comparatively sharp angle and then brought downwardly in an uncoupled position, after which the valves must be turned on so that the air can pass from one car to another. This necessitates a trainman going on the car to turn on and off the valve when coupling and uncoupling, and then necessitates the coupling operation. The construction shown in the drawing, by reason of the valves 7 and 8, obviates the necessity of going on the car to turn on and off the air as the coupling act or the uncoupling act will perform these functions. As the operation of the handles was necessary to couple and uncouple, and as the handles were connected with the valves, it would be impossible to either couple or uncouple without changing the passageway for the air, whereby air is always provided when the parts are coupled and is always turned off when the parts are uncoupled manually. The coupling is intended to occupy the usual place of couplers now in use, namely, at a point considerably below the air pipe line on the cars, so that in case the cars should separate without the coupler being normally uncoupled, the straining of the hose and, consequently, straining of the coupler, would cause an automatic uncoupling in a similar manner to the uncoupling of the standard coupler now in common use. This way of uncoupling will, of course, leave the valves open so that the air will escape and the brakes will thereby be automatically applied. The coupler has been described particularly in regard to the air brake system of trains but it will be evident that the coupler could be used for coupling steam pipes, steam hose or the like, or in fact, connecting any conductors of liquid or fluid matter without departing from the spirit of the invention. It will also be understood that the term coupler for air brake systems or other similar terms is to include coupling for steam systems or other places where the coupling device may be utilized.

What I claim is:

1. A coupling for the air brake system of trains, comprising a pair of coupling members, each of said members having a projecting member formed with a bead, a tiltable ring arranged on each of said members formed with a bead coacting with the first mentioned bead, said beads overlapping when the members of the coupler are ready to be coupled, and means acting on the rings for tilting the same so as to interlock said beads and press said members toward each other.

2. A coupling, comprising a pair of identically constructed members, each of said members being formed with a valve casing and a valve arranged in said casing, an operating handle, and tiltable rings operated by said handle for clamping said members together in a locked position when the valve is opened.

3. A coupler of the character described, comprising a pair of identically constructed members, each of said members being formed with a valve casing a valve member arranged in said casing, a handle for operating said valve member, a tiltable ring for clamping said coupler members together, said ring being provided with a pair of oppositely facing cams, and arms on said handle engaging said cams whereby when the handle is turned in one direction one cam will be moved for causing said coupler members to interlock and when moving in the opposite direction for causing one of the arms to engage a second cam and move said ring to an unlocked position.

4. A coupler for air brake systems of trains comprising a pair of coupling members, each of said coupling members having a projection, a tiltable ring arranged on each of said members formed with an extension coacting with said projection, said extension and said projection overlapping when the members of the coupler are ready to be coupled, and means acting on the rings for tilting the same so as to interlock said extensions and said projections and press said members toward each other.

EDWARD WILSON DE WILTON.

Copies of this patent may be obtained for five cents each, by addressing the "Commissioner of Patents, Washington, D. C."